No. 828,321. PATENTED AUG. 14, 1906.
L. C. KIMBERLY.
HAME TIE FASTENER FOR HARNESS AND HOLDBACK STRAPS.
APPLICATION FILED MAY 31, 1904.

Witnesses:
M. S. Hamer
T. A. Boyle

Inventor,
L. C. Kimberly
By J. L. Heese
Atty.

UNITED STATES PATENT OFFICE.

LUMAN C. KIMBERLY, OF CIRCLEVILLE, OHIO, ASSIGNOR OF ONE-THIRD TO JOSEPH R. NOECKER, OF CIRCLEVILLE, OHIO.

HAME-TIE FASTENER FOR HARNESS AND HOLDBACK-STRAPS.

No. 828,321.     Specification of Letters Patent.     Patented Aug. 14, 1906.

Application filed May 31, 1904. Serial No. 210,430.

*To all whom it may concern:*

Be it known that I, LUMAN C. KIMBERLY, a citizen of the United States, residing at Circleville, in the county of Pickaway and State of Ohio, have invented certain new and useful Improvements in Hame-Tie Fasteners for Harness and Holdback-Straps, of which the following is a specification.

My invention relates to improvements in a hame-tie fastener for harness and holdback-fastener for connecting the harness with the shafts of vehicles in which the strap is attached from one end of the fastener and a clutch or eccentric is used on the fastener to securely hold one end of the strap; and the objects of my invention are, first, to draw the hames of the harness to any fraction of an inch of nearness together; second, convenience, facility, and security in fastening; third, to dispense with weakening the strap by punching holes through it and to get the pull on the whole width of the strap. I attain these objects by the mechanism illustrated in the accompanying drawings, in which—

Figure 1:
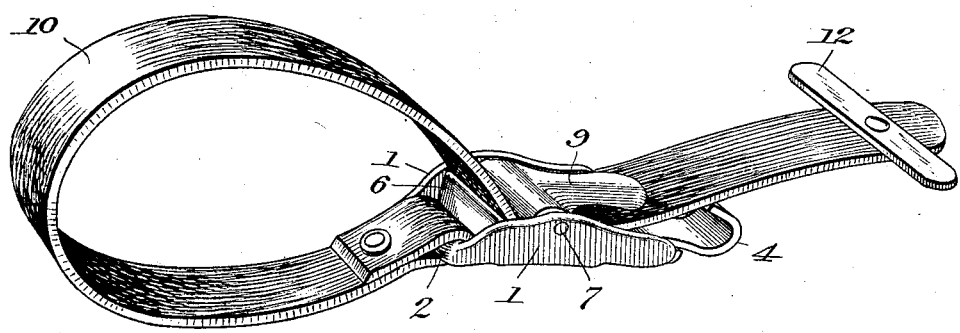
Figure 2:
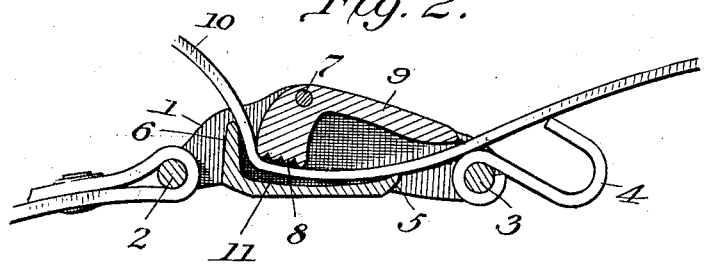
Figure 3:
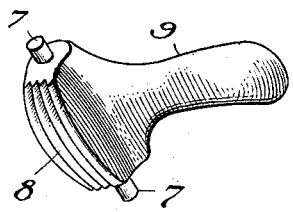

Figure 1 represents the fastener with all of its parts and the strap attached. Fig. 2 represents a longitudinal sectional view. Fig. 3 represents the eccentric clutch.

Similar figures refer to similar parts throughout the different views.

1 1 are the sides of the fastener, which are raised near their middle parts to make room for the strap to work between a transverse trough in the bottom of the fastener and the foot of the clutch.

2 is a cylindrical end attached by its ends to the sides of the fastener, but detached from the bottom, around which one end of the strap 10 is fastened.

3 is a similar cylindrical end for attaching the hame-hook 4, which hooks in the eye of one of the hames.

5 is a partition across the bottom of the fastener to press the strap against the arm of the clutch 9.

6 is a partition across the fastener in the rear of the clutch for the purpose of bending the strap and making a shoulder for it to pull against, pressing the strap closer against the rear of the clutch and making the trough deeper.

7 7 are tips on the sides of the clutch for fastening it in holes in the sides 1 1.

8 represents the corrugations on the foot of the clutch to hold the strap more securely.

9 is the arm of the clutch for fastening and loosening the strap.

10 is the strap, which after passing through the eye of one of the hames passes between the clutch and the bottom of the fastener 11, where it may be used and remain indefinitely, being kept in place by the cross-bar 12, for it is not necessary to remove the free end of the strap from beneath the clutch in order to open the hames, but simply loosen it enough to remove the hook from the eye of the hame.

The fastener is manipulated in the same manner when used for the holdback by attaching one end to the harness and the other to the shaft.

Having thus described my invention, what I claim, and desire to secure by Letters Patent, is—

1. In a hame and holdback fastener, the combination with the body of the fastener; consisting of a rectangular bottom, having a transverse trough near its middle part, and having transverse cylindrical ends and a flange on each side, and a strap attached with one of its ends about one of said cylindrical ends, of a hook loosely attached with one of its ends about the other cylindrical end, substantially as set forth.

2. In a hame and holdback fastener, the combination with the body of the fastener, consisting of a rectangular bottom, having a transverse trough near its middle part and transverse cylindrical ends attached by their ends to the sides and detached from said bottom and a flange on each side, a broad hook loosely attached with one end about one of said cylindrical ends, of a clutch pivotally attached, in and between said flanges, having a corrugated foot and an arm extending from its top nearly at a right angle to said foot, substantially as set forth.

3. In a hame and holdback fastener, the combination with the body of the fastener, consisting of a rectangular bottom, having a transverse trough near its middle part and transverse cylindrical ends attached by their ends to the sides and detached from said bottom and a flange on each side, a strap attached with one end secured about one of said cylindrical ends, a broad hook attached with one end loosely about the other of said cylindrical ends, of a clutch pivotally attached, in and between said flanges, having a corrugated foot and an arm extending from its top nearly at a right angle to said foot, substantially as set forth.

4. In a hame and holdback fastener, the combination with the body of the fastener, consisting of a rectangular bottom, having a transverse trough near its middle part and transverse cylindrical ends attached by their ends to the sides and detached from said bottom and a flange on each side, a strap attached with one end secured about one of said cylindrical ends and having a cross, or button, on its free end, a broad hook attached with one end loosely about the other of said cylindrical ends, of a clutch pivotally attached, in and between said flanges, having a corrugated foot and an arm extending from its top at nearly a right angle to said foot, substantially as set forth.

In testimony whereof I affix my signature in presence of two witnesses.

LUMAN C. KIMBERLY.

Witnesses:
 FRANK MCGINNIS,
 CLINTON STRAUSER.